Figure 1:
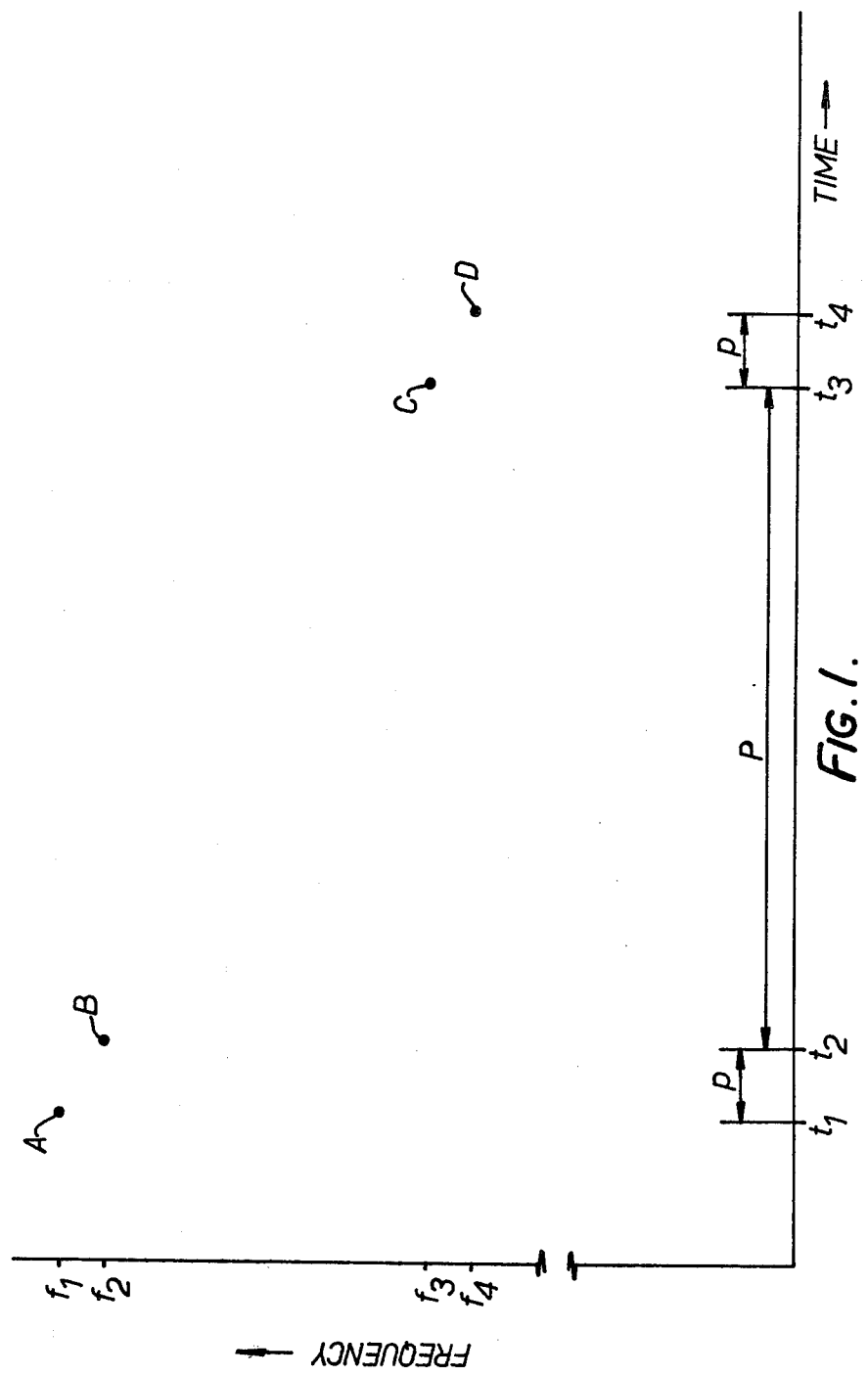

United States Patent [19]

Glasgow

[11] 4,206,463

[45] Jun. 3, 1980

[54] RADAR SYSTEMS

[75] Inventor: John A. Glasgow, Great Baddow, England

[73] Assignee: The Marconi Company Limited, Chelmsford, England

[21] Appl. No.: 926,733

[22] Filed: Jul. 21, 1978

[30] Foreign Application Priority Data

Aug. 2, 1977 [GB] United Kingdom ............... 32460/77

[51] Int. Cl.² .............................................. G01S 9/23
[52] U.S. Cl. .................................. 343/17.2 R; 343/7.7
[58] Field of Search ............................. 343/7.7, 17.2 R

[56] References Cited

U.S. PATENT DOCUMENTS

| | | | |
|---|---|---|---|
| 3,403,394 | 9/1968 | Rovault | 343/17.2R X |
| 3,487,406 | 12/1969 | Howard | 343/17.2 R X |
| 3,713,152 | 1/1973 | Castets et al. | 343/7.7 |
| 3,797,016 | 3/1974 | Martin | 343/7.7 |
| 3,971,997 | 7/1976 | Lewis et al. | 343/7.7 X |
| 4,118,703 | 10/1978 | Williams | 343/17.2 R |

Primary Examiner—T. H. Tubbesing
Attorney, Agent, or Firm—Diller, Ramik & Wight

[57] ABSTRACT

The invention principally concerns marine radar systems and seeks to reduce "sea clutter". The radar transmitter is arranged to transmit a set of four pulses forming two pairs of pulses in which the pulses of a pair are time spaced by the radar interpulse period and frequency spaced by the reciprocal radar pulse length. The pairs of pulses are frequency and time spaced by several times the frequency and time spacing of the two pulses in a pair. Transmission takes place from a rotatable antenna which exhibits squint and the antenna is rotated at a rate which having regard to the squint effect and the time separation of the pulses is such that all of the four pulses irradiate the same areas in the plane of rotation of the antenna. This renders possible signal processing in the radar receiver to achieve both frequency and time decorrelation of clutter.

3 Claims, 2 Drawing Figures

RADAR SYSTEMS

This invention relates to radar systems and in particular to marine radar systems.

Marine radar systems tend to suffer from a phenomenon known as "sea clutter". It is well known that the radar return from sea clutter is more spiky than white noise. This is thought to be due partly to the facetted nature of the sea surface with some facets producing a high level return and partly to the occasional in-phase vector addition of the return from a number of facets. The lower general background level of the clutter return is thought to be due to a variation of the latter effect where the number of facets is very large; the level of return from the individual facets very small; and the multitude of returns causing the central limit theorem to apply thus making the general low level clutter background noiselike.

One prior proposal for the reduction of the effect of sea clutter follows from this. It has been suggested that if a radar is operated at a number of spaced frequencies the clutter becomes more noiselike. This reduction in the spikyness of clutter can help to reduce its appearance on the display. A discussion of this clutter reduction technique is given in Philips Technical Revue Vol. 29 No. 1 1970 "Measurements of sea clutter correlation with frequency agility and fixed frequency radar" by G. Lind.

An alternative technique of sea clutter reduction is to make observations of the sea clutter return at times that are sufficiently spaced that the natural motion of the sea surface will have changed the local characteristics and hence the structure of the returned sea echo.

Neither of the above proposals has proved to be completely successful however.

The present invention seeks to provide an improved radar system and in particular an improved marine radar system in which the effects of sea clutter are reduced.

According to one aspect of this invention a radar system comprises a radar transmitting arrangement adapted to transmit a set of pulses including at least two which are spaced in frequency and time from a rotatable antenna system arranged to exhibit squint such that as said antenna rotates and said at least two pulses are transmitted in sequence all of the pulses in a set irradiate substantially the same patch of clutter in the plane of rotation and a radar receiving arrangement comprising means for receiving returns from said at least two pulses and means for processing said returns to provide for decorrelation of clutter both in frequency and time.

According to a feature of this invention a radar transmitting arrangement is adapted to transmit a set of pulses including at least two which are spaced in frequency and time from a rotatable antenna system arranged to exhibit squint such that as said antenna rotates and said at least two pulses are transmitted in sequence all of the pulses in a set irradiate substantially the same patch of clutter in the plane of rotation.

It will be appreciated that said radar transmitting arrangement may be arranged to transmit other sets of pulses in addition to said set.

According to another feature of this invention a radar receiving arrangement comprises means for receiving returns from a set of pulses comprising at least two pulses spaced in frequency and time and irradiating substantially the same patch of clutter and means for processing said returns to provide for decorrelation of clutter both in frequency and time.

In one example, said set of pulses comprises four pulses forming two pairs of pulses each pulse of a pair being relatively closely spaced from the other in frequency and time and each pair being relatively widely spaced from the other pair in frequency and time.

In one embodiment of the invention the frequencies of said four pulses are sequentially lower. However if the antenna is fed from its opposite end the frequencies of said four pulses may be sequentially higher.

Preferably the time separation of two pulses in a pair corresponds at least approximately to the radar interpulse period, e.g. one millisecond.

Preferably the frequency separation of two pulses in a pair approximately corresponds to the reciprocal of the radar pulse length and preferably the former is slightly greater than the latter.

Normally the frequency and time spacing of the pairs of pulses will be several times the frequency and time spacing of the two pulses in a pair, e.g. of the order of seven times.

Figure 2:
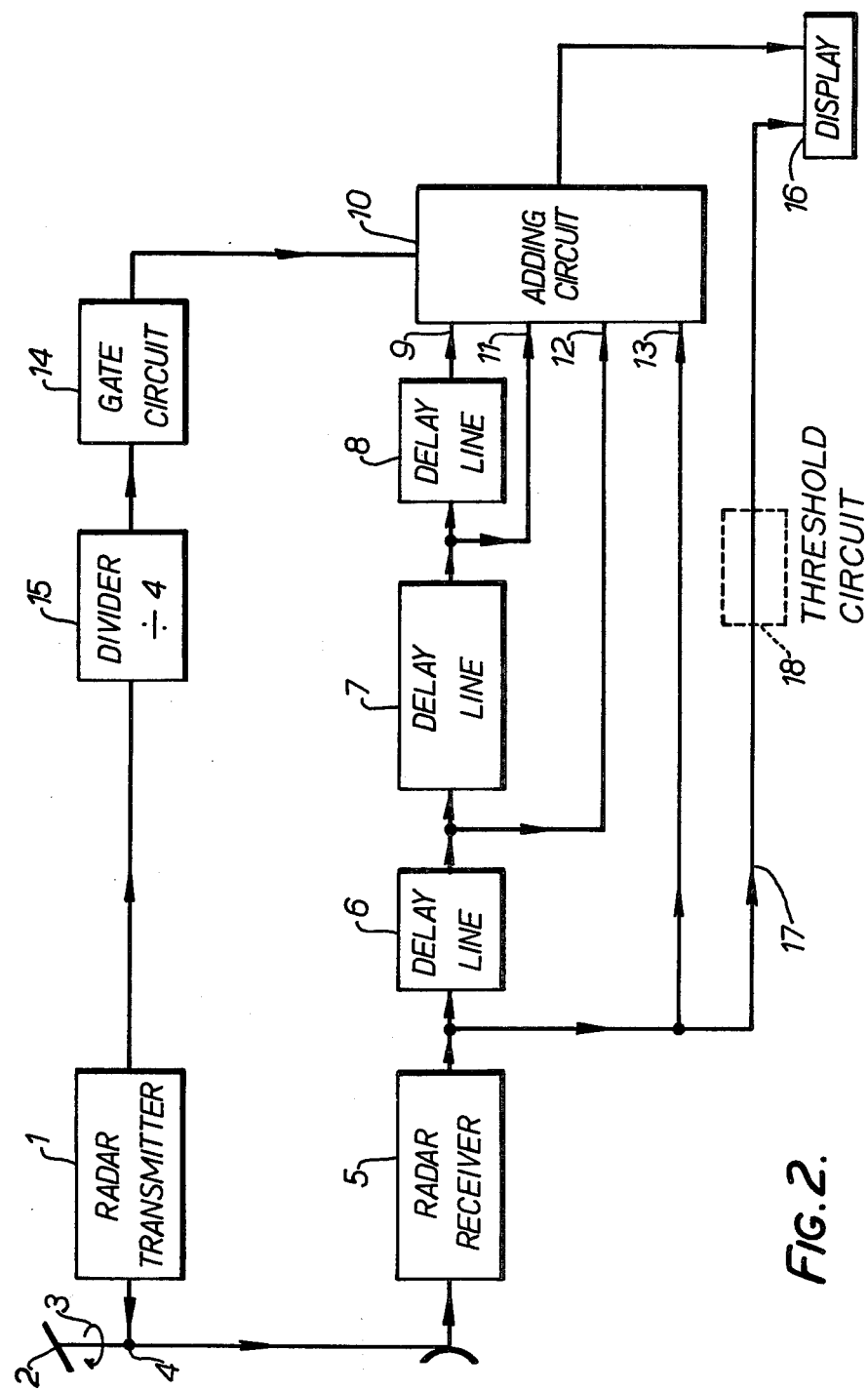

The invention is further described with reference to the accompanying drawings in which, FIG. 1 is a graph relating frequency and time to illustrate the frequency and time relationship of the four pulses, forming two pairs, in a set, in accordance with one example of the present invention and FIG. 2 is a block schematic diagram illustrating one marine radar system in accordance with the present invention including the processing circuits for the reduction of sea clutter.

Referring to FIG. 1, the radar transmitter is arranged to be capable of transmitting, at different times, pulses at four different carrier frequencies, by, for example, utilising a four-frequency multipactor tuned magnetron oscillator or two two-frequency multipactor tuned magnetron oscillators operating in tandem, or four single frequency magnetrons operated sequentially.

In sequence, first, at time $t_1$, pulse A is transmitted with a carrier frequency $f_1$. Next, at time $t_2$ a period of time p after the transmission of pulse A, a second pulse B is transmitted with a carrier frequency $f_2$ slightly lower than $f_1$.

The time period p is, in this example, one millisecond which is typical of the radar interpulse period. The frequency difference between frequency $f_1$ and frequency $f_2$ approximates to the reciprocal of the radar pulse length (1) and in practice the former is made slightly greater than the latter.

Then, following a time period P several times the time period p separating the two pulses A and B, and with yet lower carrier frequencies, a further pair of pulses C and D are transmitted with pulse D time and frequency spaced from pulse C by a time period p and a frequency difference equal to that in the case of pulses B and A. The frequency spacing between pulse C and pulse B, is several times the frequency spacing between the pulses A and B or C and D.

The pulses A, B, C and D are transmitted from an aerial array which has squint, that is to say, the directivity of the main beam will vary to some extent with frequency. If the antenna is stationary the effect of transmitting the pulses A, B, C and D in the sequence above described would be that each pulse would sequentially irradiate different areas spaced in relation to the frequency spacing of the pulses A, B, C and D.

The radar antenna, is, however, rotatable at a rotational rate which, having regard to the squint effect described above and the time separation of the pulses, is such that all of the pulses A, B, C and D irradiate the same areas in the plane of rotation of the antenna.

It is now possible for signal processing in the receiver to achieve both frequency and time decorrelation of clutter. The processing may be arranged to decorrelate the clutter returns on a frequency basis with the pair of pulses A and B and similarly with the pair of pulses C and D. At the same time by arranging for the same path of clutter to be irradiated by the four pulses A, B, C and D, two close together in time and in frequency followed, after a considerable time interval, by a further two close together in time and frequency, the processing may be arranged to take advantage of the period of time between the pairs of pulses to utilise the time decorrelation of the clutter from the same patch.

Where, for example, multipactor turned magnetrons are used, the frequencies used in the system and the processing provided would be selected having regard to the frequencies provided by the multipactor action of the magnetrons available.

Referring to FIG. 2, the radar system schematically illustrated therein utilised analogue processing to obtain decorrelation effects already described with reference to FIG. 1.

A marine radar transmitter 1 is arranged to transmit the pulses A, B, C and D as described with reference to FIG. 1 via an antenna 2 exhibiting squint. The antenna 2, is, in fact, an end fed slot waveguide array as known per se. The rotation of the antenna 2, as represented by the arrow 3, together with the degree of dependence of the squint angle of the antenna 2 with frequency and the frequency and time separation of the pulses A, B, C and D is such that as the antenna rotates and the pulses A, B, C and D are transmitted in sequence, the squint angle of the antenna 2 increases so that each pulse irradiates at the same patch of clutter in the plane of rotation.

The returns from the four pulses A, B, C and D are received back by the antenna 2 and passed via a TR cell 4 to a radar receiver circuit 5. The output of the radar receiver circuit 5 is connected via a first delay line 6 of delay equal to the time period p between two pulses of a pair; a second delay line 7, of delay equal to the period P between pairs of pulses and a third delay line 8 having a delay which again equals the period p to one input 9 of an adding circuit 10. A separate output is derived from the delay line 7 and applied to a further input 11 of adding circuit 10. A separate output is derived from the delay line 6 and applied to a further input 12 of the adding circuit 10, and a separate output is derived from the radar receiver 5 and connected to a further input 13 of adding circuit 10.

Since four returns are required before a fully processed signal can be produced by adding circuit 10, this latter is gated to produce an output only when the four returns due to the pulses A, B, C and D have been received. The required gating circuit is represented at 14. This is driven from synch pulses derived from the radar transmitter 1 via a divide-by-four divider 15.

Because of the action of the delay lines 6, 7 and 8, in the adding circuit 10 the return signals corresponding to the same range interval for each of the four pulses are added together and the sum is presented as processed output to a display unit 16.

When the system is operated, returns from fixed targets and from those which do not move appreciably during the processing time for all four transmissions will appear at the same range and will thus appear in the processed output whilst clutter highlights will be reduced.

Referring back to FIG. 1 and considering the relationship between frequency, time period p, time period P and the law of squint with frequency and antenna rotation rate, it would be desirable to arrange matters so that all four pulses A, B, C and D "looked" in the same physical direction. Whilst desirable, this is not absolutely essential as the finite beamwidth of the radiated beam together with the "flatness" of the nose of the beam will permit some inaccuracy.

The whole object is of course to enhance the appearance of the signals displayed by display unit 16 in the presence and neighbourhood of clutter, and subjectively the appearance of the display may be improved by adding to the output of the adding circuit 10 a portion of the raw video output of the radar receiver 5. This is represented by the connection 17 extending from the output of the radar receiver 5, in this case, directly into the display unit 16. In the path of connection 17, block 18 is represented in dashed outline. The block 18 represents a threshold circuit which may be provided to achieve the effect that only that part of the raw radar output of receiver 5 which is higher than a given threshold is added to the display. The threshold level is arranged so that little of the noise or general level of background clutter appearing in the raw radar output would pass to the display but so that echoes from large fixed and slowly moving targets such as coastlines and vessels appear more strongly on the display screen.

As will be appreciated improvements in the performance of a radar system as regards signal to clutter is subjective in nature, in particular where the operator is interested in targets which are only marginally detectable against the background of clutter. Thus, the connection of raw video output from radar receiver 5 to the display 16 and or the inclusion in the connection path of connection 17 of the threshold circuit 18 may be made optional to the operator so that the latter may decide for himself which arrangement best suits him.

Furthermore, in some cases some operators may find the use of a multiplying circuit in place of the adding circuit 10 or some combination of addition and multiplication of the signals appearing at the four inputs 9, 11, 12 and 13 may subjectively, be best suited to themselves. If desired, therefore, a degree of option may be provided as to whether the adding circuit 10 is substituted by a multiplying circuit or a circuit providing a combination of addition and multiplication.

Whilst the arrangement described with reference to FIGS. 1 and 2 employs four pulses comprising two pairs, in practice it is possible to obtain frequency and time decorrelation of clutter with two single well spaced pulses, e.g. pulses A and C in FIG. 1. However, in general the greater the number of different pulses employed the greater the improvement in clutter decorrelation will be achieved.

If a large number of pulses in a set is utilised, however, for example eight pulses, then as will be appreciated, utilising the processing illustrated in FIG. 2, fully processed output will only be produced after each eighth pulse. Not only would this be undesirable from the display point of view but also this could lead to a certain amount of "spokiness" (i.e. the appearance of "spokes" as on a wheel due to the lack of numbers of processed signals) in the display. In cases where a relatively large number of pulses are utilised in a set, for example eight pulses, a modification may be made whereby fully processed signals are produced at the output of the adding circuit 10 of FIG. 2 at every eighth pulse whilst a partial processed output is arranged to be produced at other times leading up to the fully processed output. For example prior to the fully processed output, the results of processing seven of the eight pulses could be fed to the display and similarly prior to the result of processing the seven pulses, an output of six process pulses could be produced, and so on.

I claim:

1. A marine radar system comprising, in combination:
   an antenna which exhibits frequency-dependent squint;
   means for rotating said antenna repetitively to scan a target region afflicted with sea clutter;
   transmitting means connected to said antenna for transmitting a succession of at least two pulses of different frequencies to cover a particular area of said target region during each scan, the frequency difference between said successive pulses being such that each of said pulses irradiates said particular area during each scan whereby frequency decorrelation of sea clutter may be effected, and at least two pulses of said succession being separated in time sufficient to allow time decorrelation of sea clutter to be effected;
   receiving means connected to said antenna for receiving returns from said succession of pulses; and
   processing means for processing said returns to provide decorrelation of sea clutter both in frequency and time, each succession of pulses comprising two pairs of pulses in which each pair is closely spaced in frequency and time whereas said two pairs are widely spaced in time, said transmitting means including gating means connected to said processing means for gating returns from both pairs of pulses simultaneously to said processing means.

2. A marine radar system as defined in claim 1 including delay means connecting said receiving means with said processing means for inputting returns from both pulse pairs simultaneously to the processing means.

3. A marine radar system comprising, in combination:
   an antenna which exhibits frequency-dependent squint;
   means for rotating said antenna repetitively to scan a target region afflicted with sea clutter;
   transmitting means connected to said antenna for transmitting a succession of at least two pulses of different frequencies to cover a particular area of said target region during each scan, the frequency difference between said successive pulses being such that each of said pulses irradiates said particular area during each scan whereby frequency decorrelation of sea clutter may be effected, and at least two pulses of said succession being separated in time sufficient to allow time decorrelation of sea clutter to be effected;
   receiving means connected to said antenna for receiving returns from said succession of pulses;
   processing means for processing said returns to provide decorrelation of sea clutter both in frequency and time;
   display means connected to said processing means; and
   circuit means connecting said display means directly to said receiving means and including threshold means for rejecting raw data from the receiving means which is less than a selected threshold.

* * * * *